United States Patent [19]

Ernst et al.

[11] Patent Number: 4,597,796
[45] Date of Patent: Jul. 1, 1986

[54] ONE-COMPONENT ALKALI METAL SILICATE CEMENT COMPOSITION

[75] Inventors: Josef Ernst, Eppstein; Hans-Joachim Semmler, Hochheim am Main, both of Fed. Rep. of Germany

[73] Assignee: Hoechst Aktiengesellschaft, Fed. Rep. of Germany

[21] Appl. No.: 634,803

[22] Filed: Jul. 26, 1984

[30] Foreign Application Priority Data

Jul. 28, 1983 [DE] Fed. Rep. of Germany ....... 3327176

[51] Int. Cl.$^4$ ............................................. C04B 19/04
[52] U.S. Cl. ......................................... 106/74; 106/84; 106/314; 106/38.3
[58] Field of Search ................... 106/74, 84, 314, 38.3

[56] References Cited

U.S. PATENT DOCUMENTS

| | | | |
|---|---|---|---|
| 3,445,257 | 5/1965 | Hloch et al. | 106/84 |
| 3,454,410 | 7/1969 | Schutt et al. | 106/74 |
| 4,227,932 | 10/1980 | Leah et al. | 106/84 |
| 4,319,926 | 3/1982 | Nowakowski et al. | 106/74 |
| 4,482,380 | 11/1984 | Schlegel | 106/84 |

FOREIGN PATENT DOCUMENTS 1262162 2/1972 United Kingdom ................. 106/74

OTHER PUBLICATIONS

U.S. Dept. of the Interior Water and Power Resources Service, "Concrete Manual", 1981, pp. 51–52.

Primary Examiner—William R. Dixon, Jr.
Assistant Examiner—Ann Knab
Attorney, Agent, or Firm—Connolly and Hutz

[57] ABSTRACT

A dry one-component alkali metal silicate cement composition contains the following components:
(a) condensed aluminum phosphate or condensed aluminum/iron phosphate as hardener in amounts between 2–10% by weight,
(b) rounded quartz sand having a grain size between 0.01 and 0.5 mm in amounts of 30–70% by weight,
(c) clay constituents in amounts of 10–40% by weight,
(d) kieselguhr in amounts of 1–5% by weight,
(e) mineral oil in amounts of 0.05–1% by weight and
(f) solid pulverulent sodium silicate, potassium silicate or mixtures thereof in amounts of 10–25% by weight.

The composition is free of surfactant. When combined with water the cement is slow to set into an acid-resistant mortar.

8 Claims, No Drawings

ONE-COMPONENT ALKALI METAL SILICATE CEMENT COMPOSITION

The present invention relates to a dry, surfactant-free one-component alkali metal silicate cement composition which is suitable for preparing acid-resistant cements and acid-resistant mortars and also for application by means of concrete guns, especially by guniting.

One-component cement compositions which can be used for preparing acid-resistant cements and be applied by guniting can be produced, according to German Auslegeschrift No. 1,571,485, on the basis of dry sodium silicate and an aluminum phosphate hardener. Analogous mixtures which are based on potassium silicate and an aluminum phosphate hardener are the subject matter of German Offenlegungsschrift No. 3,006,551.

Said acid-resistant cements not only can be applied by means of concrete guns but also serve for bedding down acid-resistant bricks, building them into walls, and positioning the masonry. The cements become hard as a result of silicic acid being formed in the course of the reaction of silicate with acid formed from the aluminum phosphate hardener by adding water.

It is essential that in existing mixtures the silicate is in the form of a powder, i.e. in a readily reactive form. Another essential factor is the presence of major proportions of acid-resistant fillers, such as, for example, quartz sand.

According to German Offenlegungsschrift No. 3,006,551, the cement composition must contain both a mineral oil (for hydrophobizing the mixture) and a surfactant. The surfactant content, however, can lead to slipperiness on processing by guniting.

Since the surfactants decompose at elevated temperatures, they reduce the thermal stability of the acid-resistant cements and impair the refractory properties. Finally, in some cases the state of the art cements are of only low suppleness.

Certain cements are not very stable in the sense that, when used in building a wall, they are squeezed out of the joints by the weight of the bricks.

The existing dry one-component alkali metal silicate cement compositions usually contain at least some fine quartz-containing components (quartz dust). They also contain quartz sand, preferably sands having a markedly angular structure. These angular sands are produced by crushing. Both the sands produced by crushing and the ground quartz, however, also contain particles having sizes of the order of those of silicosic dusts. So there is a high safety risk to the processors of the mixtures, in particular if guniting is used.

It is therefore the object of the present invention to develop a new one-component alkali metal silicate cement composition which does not have the disadvantages of the existing mixtures, contains no silicosic quartz dust, and nevertheless has good mechanical and thermal properties.

This object is achieved by providing a dry surfactant-free one-component alkali metal silicate cement composition which meets these demands and contains the following components:

(a) metal phosphate hardener in amounts of 2–10% by weight selected from the group consisting of condensed aluminum phosphate and condensed iron-/aluminum phosphate,
(b) rounded quartz sand having a grain size between 0.01 and 0.5 mm in amounts of 30–70% by weight,
(c) clay in amounts of 10–40% by weight,
(d) kieselguhr in amounts of 1–5% by weight,
(e) mineral oil in amounts of 0.05–1% by weight and
(f) solid pulverulent sodium silicate, potassium silicate or mixtures thereof in amounts of 10–25% by weight.

Condensed aluminum phosphates suitable for use as hardeners are described in U.S. Pat. No. 3,445,257 (Hioch et al), May 20, 1969 (German Pat. No. 1,252,835,) and condensed iron/aluminum phosphates are described in U.S. Pat. No. 4,482,380 (Schlegel), issued Nov. 13, 1984 (German Offenlegungsschrift No. 3,133,354). The clay components used should be dry. Kaolinitic clay is preferred. The kieselguhr used has preferably not been calcined. The molar ratio of $SiO_2$/alkali metal oxide should be about 1–1.5 in the case of potassium silicate and 2.0 to 3.3 in the case of sodium silicate. About 2.5 to 3.5 parts by weight of sodium silicate or 3.5 to 4.5 parts by weight of potassium silicate are required per part by weight of phosphate hardener.

The round quartz sands used should have an angularity ratio of less than 1.5, preferably less than 1.4. Angularity ratio is the ratio of the surface area determined in practice to the theoretical surface area, which is taken as the surface area calculated from the particle size spectrum on the assumption that the particles are spherical and have the same volume.

A dry one-component cement composition according to the invention can be prepared as follows:

Selected quartz sands having an average particle size of 0.23 to about 0.1 mm are carefully mixed with the phosphate hardener, the clay and the kieselguhr, and the mixture is sprayed with a small amount of machine oil. Separately, a mixture of silicate powder of the desired grade is likewise sprayed with a small amount of machine oil. The two sprayed portions are then carefully mixed with each other. They are sprayed separately in order to keep the surface of the alkali metal silicate separate from that of the active phosphate hardener. The mineral oils used, which are normally customary machine oils, must therefore be inert to both the alkali metal silicate and the phosphate hardener used. However, any customary mineral oil meets this requirement.

If the cement composition according to the invention is to be processed by guniting, it is preferable for the rounded quartz sand to have grain sizes between 0.06 and 0.32 mm, in particular 0.1 and 0.23 mm. With these grain sizes, the preferred quartz sand level is between 35 and 60%, in particular between 40 and 58% by weight. In choosing the rounded quartz sand, the clay and the kieselguhr, care has to be exercised to ensure that virtually no fines below 30 microns are present, since they could act as silicosic dust.

In guniting, a fast-setting water-containing one-component cement is applied to horizontal, inclined or vertical surfaces in thicknesses of about 1 to 3 cm, and solidifies there. The water-containing cement is prepared by introducing dry alkali metal silicate cement into the feed compartment of a concrete gun, pressurizing the feed compartment by means of compressed air, transferring measured portions of the dry cement from the feed compartment to the nozzle of the gun by means of a feed hose, and introducing water from a pressurized water supply line into the gun nozzle in order to mix the water with the cement at that point. The mixture of alkali metal silicate cement and water is applied to appropriately pretreated selected surfaces by means of, for example, a hose. The cement takes a number of minutes to set on the surfaces. If the one-component alkali metal cements according to the invention are used, the coatings are acid-resistant and very highly resistant to temperature shocks.

The use of the dry one-component alkali metal silicate cement composition according to the invention is particularly interesting for producing corrosion-preventing protective layers on steel surfaces which are exposed to elevated temperatures. Such protective layers are successfully used as inner linings in quenches in waste incineration systems, recuperators in blast furnaces, hot-air lines and gas coolers. The recuperators generally have a diameter of about 10 m and a height of 50 m. They are coated by first of all cleaning the entire inner steel surface and then applying a cement/water mixture by starting at the top and working downwards using a dry-feed spray-gun. This type of machine permits continuous uniform spray-dispensing without interruptions. The layer sprayed on in the case of blast furnace recuperators has an overall thickness of about 8 to 12 mm. The inner lining of chimney heads made of steel can similarly be produced with the cement composition according to the invention.

The amount of material which does not stick and comes back off the steel surface, the amount of dust produced, and the degree of compaction of the layer of sprayed material are all dependent on the spray pressure. The spray pressure at the nozzle depends on the length and the hydrostatic height of the hose for transporting the material. The amount of material coming back off further depends on the composition of the material, the spray gun, the tackiness of the substrate, the rate of air change at the site of the work and the uniformity of application, i.e. the experience of the operating personnel. The water must be metered evenly and carefully so as to avoid forming pockets where the distribution of water and solids differs. Vibrations should be avoided between spraying on the layer and its hardening, since otherwise there is the danger that the material will slide off while still wet or that, after some days, the set coating will lose its adhesion to the substrate.

The following examples illustrate the invention in more detail.

EXAMPLE 1

The following dry one-component start mixtures were mixed with water and processed into cements. The set cements were measured for resistance to acid, resistance to water, and mechanical values. The measured results substantially agree with the results in Example 9 of German Auslegeschrift No. 1,571,485.

Mixture 1

17.0% by weight of silicate powder (27% by weight of $Na_2O$, 54% of $SiO_2$, 19% of $H_2O$)
0.3% by weight of machine oil,
20.0% by weight of very fine clay,
2.0% by weight of kieselguhr,
5.7% by weight of hardener described in U.S. Pat. No. 3,445,257 (German Pat. No. 1,252,835) and
55.0% of quartz sand*

*The quartz sand is composed of rounded and washed sands having an average grain size of 0.15 mm and an average grain size of 0.23 mm in a ratio of approximately 1:2. The angularity ratio is below 1.4.

Mixture 2

13.6 by weight of silicate powder (27% of $Na_2O$, 54% of $SiO_2$, 19% of $H_2O$),
3.4% by weight of silicate powder (28% of $K_2O$, 56% of $SiO_2$, 16% of $H_2O$),
0.3% by weight of machine oil,
23.0% by weight of very fine clay,
2.0% by weight of kieselguhr,
6.0% by weight of hardener described in German Pat. No. 1,252,835 and
51.7% by weight of quartz sand of mixture 1.

Mixture 1 is mixed with water in a ratio of 14 parts by weight of water per 100 parts by weight of dry one-component start mixture.

Mixture 2 is mixed with water in a ratio of 15–16 parts by weight of water per 100 parts by weight of dry one-component starting mixture.

The cement materials are readily processable, are readily usable in masonry work and are stable compared with other comparable cements in the sense that they are not squeezed out of the joint by the weight of the brick. They are therefore more economical to use. There is no need for special precautions against the raising of silicosic dust, since there is no fine quartz dust present in the dry starting mixtures.

EXAMPLE 2

A dry one-component starting mixture is prepared on the basis of the following recipe:

17.0% by weight of silicate powder (28% of $K_2O$ 56% of $SiO_2$, 16% of $H_2O$),
0.3% by weight of machine oil,
0.3% by weight of stucco,
5.4% by weight of hardener,
1.0% by weight of kieselguhr,
16.0% by weight of fine clay and
60.0% by weight of quartz sand of mixture 1.

This dry starting mixture is introduced into the funnel of a sprayer (an Aliva 242 rotor machine with revolver system from Aliva AG, Widen, Switzerland) and is passed to the rotor via a star-shaped stirrer. The rotor chambers transport the still pulverulent mixture to the outlet, where it is passed to the nozzle in an air stream. In the spray-dispensing nozzle, 18 to 20 parts by weight of water are metered and mixed in per 100 parts by weight of pulverulent mixture under a pressure of 3 to 4 bar. The cement is sprayed in one step onto the sandblasted metal wall by the compressed air applied to the feed compartment. The cement hardens at 20° C. in the course of 24 hours. The coating of an area of 1 m² in a thickness of 10 mm requires about 18 kg of dry starting mixture plus about 3.4 kg of water. The steel surface thus treated to have a coating of 1–2 cm is resistant to organic and inorganic acids, except for hydrofluoric acid and concentrated phosphoric acid at very high temperatures. This coating is also resistant to oils, solvents, fats and oxidizing agents. It is not resistant to strong alkali. The temperature shock resistance of these coatings is higher than that of comparable coatings described in German Offenlegungsschrift No. 3,006,551.

EXAMPLE 3

A novel starting mixture of Example 2 is compared with a known mixture (starting mixture 1 of German Offenlegungsschrift No. 1,571,485) in terms of some application data. For this purpose, the two mixtures are processed with water into cements, from which are prepared in turn cylinders having a diameter of 2.5 cm and a height of 2.5 cm. The data are obtained after storing the cylinders at room temperature for about 60 hours and additionally at 60° C. for 16 hours.

|  | Starting mixture according to Example 1 | Known starting mixture |
| --- | --- | --- |
| Water absorption | 0.5 ± 0.3% | 4.5 ± 1.2% |
| Bulk density | 1.9 g/cm$^3$ | 1.7 g/cm$^3$ |
| Open porosity | 0.8 ± 0.4% | 8 ± 2% |
| Early strength | 26.4 N/mm$^2$ | 14.9 N/mm$^2$ |

We claim:

1. A dry surfactant-free one-component alkali metal silicate cement composition which contains the following components:
   (a) metal phosphate hardener in amounts of 2–10% by weight selected from the group consisting of condensed aluminum phosphate and condensed iron-/aluminum phosphate,
   (b) rounded quartz sand having a grain size between 0.01 and 0.5 mm in amounts of 30–70% by weight,
   (c) clay constituents in amounts of 10–40% by weight,
   (d) kieselguhr in amounts of 1–5% by weight,
   (e) mineral oil in amounts of 0.05–1% by weight and
   (f) solid pulverulent sodium silicate, potassium silicate or mixtures thereof in amounts of 10–25% by weight.

2. The composition as claimed in claim 1, wherein the rounded quartz sand has a grain size between 0.06 and 0.32 mm.

3. The composition as claimed in claim 1, wherein the rounded quartz sand is used in amounts between 35 and 60%.

4. The composition as claimed in claim 1, wherein the angularity ratio of a quartz sand used is less than 1.5.

5. A process for applying an acid-resistant fast-setting one-component cement to selected surfaces by introducing a one-component alkali metal silicate cement into the feed compartment of a concrete gun or sprayer, putting the feed compartment under pressure by means of compressed air, transferring the dry cement in measured amounts from the feed compartment to the nozzle of the sprayer by means of a hose, introducing water into the sprayer nozzle from a pressurized water supply line, in order to mix the water with the cement, applying the mixture of alkali metal silicate cement and water to the selected surface, and allowing the cement to set, which comprises using a one-component alkali metal silicate cement as claimed in claim 1.

6. A process as claimed in claim 5, which comprises applying said one-component alkali metal silicate cement to a surface, in a thickness of about 1 to 3 cm, and permitting the thus-applied cement to solidify in place on said surface.

7. The composition as claimed in claim 3, wherein the rounded quartz sand is used in amounts between 40 and 58% by weight.

8. A dry surfactant-free one-component alkali metal silicate cement composition consisting essentially of:
   (a) 2–10% by weight metal phosphate hardener selected from the group consisting of condensed aluminum phosphate and condensed iron-/aluminum phosphate,
   (b) 30–70% by weight rounded quartz sand having a grain size between 0.06 and 0.5 mm and an angularity ratio less than 1.5,
   (c) clay constituents in amounts of 10–40% by weight,
   (d) 1–5% by weight kieselguhr,
   (e) 0.05–1% by weight mineral oil, and
   (f) 10–25% by weight solid pulverulent sodium silicate, potassium silicate or mixtures thereof;
   said rounded quartz, clay, and kieselguhr being selected so as to be substantially free of fines smaller than 30 microns in size.

* * * * *